(12) United States Patent
Szurek et al.

(10) Patent No.: US 9,563,187 B2
(45) Date of Patent: Feb. 7, 2017

(54) METHODS AND APPARATUS TO DISPLAY INFORMATION VIA A PROCESS CONTROL DEVICE

(71) Applicant: Bristol, Inc., Watertown, CT (US)

(72) Inventors: Scott G. Szurek, Marshalltown, IA (US); Richard J. Vanderah, Marshalltown, IA (US)

(73) Assignee: BRISTOL, INC., Houston, TX (US)

( * ) Notice: Subject to any disclaimer, the term of this patent is extended or adjusted under 35 U.S.C. 154(b) by 703 days.

(21) Appl. No.: 13/889,040

(22) Filed: May 7, 2013

(65) Prior Publication Data

US 2013/0304240 A1    Nov. 14, 2013

Related U.S. Application Data

(60) Provisional application No. 61/644,950, filed on May 9, 2012.

(51) Int. Cl.
*G05B 15/02* (2006.01)
*G05B 19/042* (2006.01)
*G01D 21/00* (2006.01)

(52) U.S. Cl.
CPC .......... *G05B 15/02* (2013.01); *G05B 19/0423* (2013.01); *G01D 21/00* (2013.01); *G05B 2219/25014* (2013.01); *G05B 2219/25428* (2013.01)

(58) Field of Classification Search
USPC ............................................ 700/83, 89, 108
See application file for complete search history.

(56) References Cited

U.S. PATENT DOCUMENTS

| | | | |
|---|---|---|---|
| 5,339,425 A | | 8/1994 | Vanderah et al. |
| 5,574,657 A | * | 11/1996 | Tofte .................... A01C 23/007 700/240 |
| 5,734,373 A | * | 3/1998 | Rosenberg .............. A63F 13/06 345/161 |

(Continued)

FOREIGN PATENT DOCUMENTS

| | | |
|---|---|---|
| DE | 102006016381 | 10/2007 |
| EP | 1435552 | 12/2003 |

OTHER PUBLICATIONS

Patent Cooperation Treaty, "International Preliminary Report on Patentability", issued in connection with international application No. PCT/US2013/040336, mailed Nov. 11, 2014, (9 pages).

(Continued)

*Primary Examiner* — Kidest Bahta
(74) *Attorney, Agent, or Firm* — Hanley, Flight & Zimmerman, LLC

(57) ABSTRACT

Methods and apparatus to display information via a process control device are disclosed herein. An example method includes acquiring first information via a first sensor of a first output device. The first information is related to an industrial process. The example method also includes communicating the first information from the first output device to a controller and receiving second information in the first output device from the controller. The second information is based on the first information. The example method also includes displaying the second information via a display of the first output device.

20 Claims, 5 Drawing Sheets

(56) References Cited

U.S. PATENT DOCUMENTS

| | | | |
|---|---|---|---|
| 5,828,851 A * | 10/1998 | Nixon | G05B 19/0421 710/105 |
| 5,901,323 A | 5/1999 | Milliken et al. | |
| 5,995,916 A * | 11/1999 | Nixon | G05B 15/02 700/117 |
| 6,008,985 A * | 12/1999 | Lake | G05B 19/0423 361/679.32 |
| 6,216,956 B1 * | 4/2001 | Ehlers | F24F 11/006 236/47 |
| 6,441,744 B1 | 8/2002 | Adams et al. | |
| 6,668,665 B2 | 12/2003 | Schimnowski et al. | |
| 6,715,360 B1 | 4/2004 | Pepperling et al. | |
| 6,771,513 B2 | 8/2004 | LaMothe et al. | |
| 6,894,659 B2 | 5/2005 | Pepperling et al. | |
| 6,903,659 B2 | 6/2005 | Vanderah et al. | |
| 6,945,125 B2 | 9/2005 | Vanderah et al. | |
| 7,049,975 B2 | 5/2006 | Vanderah et al. | |
| 7,064,671 B2 | 6/2006 | Vanderah et al. | |
| 7,089,530 B1 * | 8/2006 | Dardinski | G05B 15/02 700/83 |
| 7,150,194 B2 | 12/2006 | Pepperling et al. | |
| 7,197,407 B2 | 3/2007 | Schimnowski et al. | |
| 7,751,942 B2 * | 7/2010 | Lorton | A01K 29/00 236/49.3 |
| 7,941,489 B2 | 5/2011 | LaMothe et al. | |
| 8,144,028 B2 | 3/2012 | LaMothe et al. | |
| 8,615,374 B1 * | 12/2013 | Discenzo | G01D 21/02 219/497 |
| 2003/0006989 A1 | 1/2003 | Konrad et al. | |
| 2003/0236576 A1 * | 12/2003 | Resnick | G05B 15/02 700/9 |
| 2005/0201397 A1 * | 9/2005 | Petite | H04L 12/2825 370/401 |
| 2007/0038700 A1 * | 2/2007 | Eryurek | G05B 19/0426 709/203 |
| 2008/0122641 A1 * | 5/2008 | Amidi | G01N 33/0075 340/632 |
| 2009/0065596 A1 * | 3/2009 | Seem | F24F 11/0009 236/51 |
| 2010/0274528 A1 * | 10/2010 | Lecuyer | G05B 19/0428 702/183 |
| 2011/0022193 A1 * | 1/2011 | Panaitescu | A41D 20/00 700/29 |
| 2012/0249461 A1 * | 10/2012 | Flanagan | G06F 1/1694 345/173 |
| 2012/0306620 A1 * | 12/2012 | Karaffa | H04L 12/2825 340/6.1 |
| 2013/0053987 A1 * | 2/2013 | Galt | G05B 19/0423 700/12 |

OTHER PUBLICATIONS

Patent Cooperation Treaty, "International Search Report", issued in connection with International application No. PCT/US2013/040336, mailed Aug. 7, 2013, (3 pages).

* cited by examiner

METHODS AND APPARATUS TO DISPLAY INFORMATION VIA A PROCESS CONTROL DEVICE

RELATED APPLICATION

This patent claims priority to U.S. Provisional Application Ser. No. 61/644,950, entitled "Methods and Apparatus to Display Information via a Process Control Device," which was filed on May 9, 2012, and is hereby incorporated herein by reference in its entirety.

FIELD OF THE DISCLOSURE

This disclosure relates generally to process control devices and, more particularly, to methods and apparatus to display information via a process control device.

BACKGROUND

Generally, output devices (e.g., thermometers, pressure gauges, concentration gauges, fluid level meters, flow meters, vapor sensors, valve positioners, etc.) in a process control system are used to monitor and/or control an industrial process. The output devices often include one or more sensors to acquire information related to the process. The information is typically transmitted to a controller. The information acquired by output devices may be analyzed via the controller and used to control input devices (e.g., valves, pumps, fans, heaters, coolers, mixers, etc.) to control the process.

SUMMARY

An example apparatus disclosed herein includes a first sensor to acquire first information related to an industrial process. The example method also includes a processor in communication with a controller. The processor is to communicate the first information to the controller and receive second information from the controller. The second information includes a value of a process parameter calculated based on the first information. The example apparatus also includes a display to display the second information.

An example method includes acquiring first information via a first sensor of a first output device. The first information is related to an industrial process. The example method also includes communicating the first information from the first output device to a controller and receiving second information in the first output device from the controller. The second information is based on the first information. The example method also includes displaying the second information via a display of the first output device.

Another example method disclosed herein receiving first information related to an industrial process from a first output device. The first information is acquired via a first sensor of the first output device. The example method also includes determining a first value of a first process parameter based on the first information and communicating the first value to the first output device. The first value is to be displayed via the first output device.

DETAILED DESCRIPTION

Example apparatus and methods disclosed herein include an output device including a sensor and a display. The output device may be communicatively coupled to a controller and/or a portable field device. In some examples, the controller is communicatively coupled to a control device via a network (e.g., the internet). The output device acquires first information via the sensors. The first information is related to an industrial process. For example, the first information may include a differential pressure of a fluid, a static pressure of a fluid, a temperature of a fluid, etc. The example output device transmits the first information to the controller, the control device, and/or the portable field device. In some examples, the output device receives second information the controller, the control device, and/or the portable field device and displays the first information and/or the second information via the display. In some examples, the second information includes values calculated based on the first information. In some examples, the second information includes information acquired via another output device and/or a value calculated based on the information acquired via the other output device. Thus, the example apparatus and methods disclosed herein enable an output device to display information related to a plurality of process control devices, process conditions, portions of the industrial process, etc.

Figure 1:
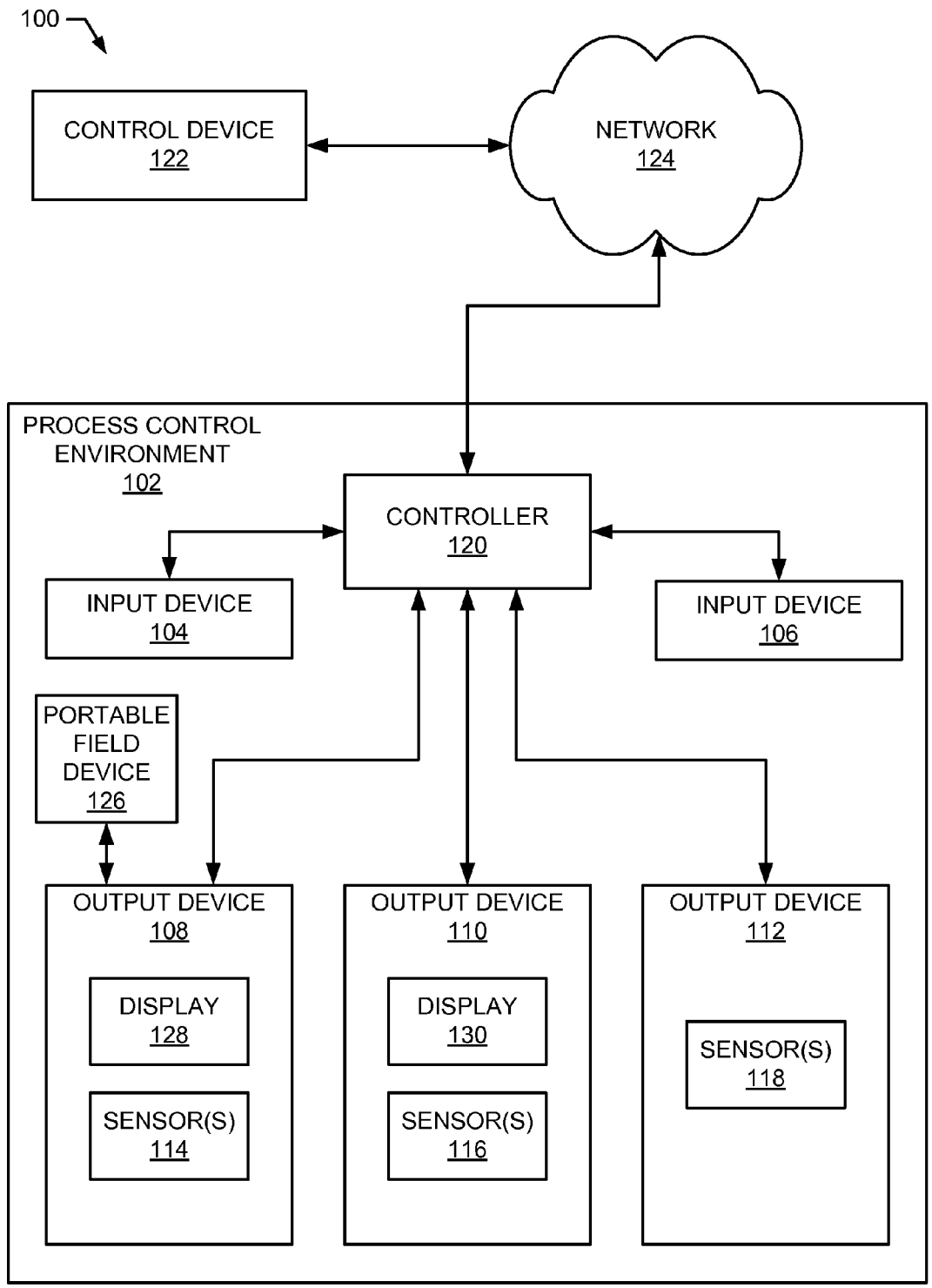
FIG. 1 illustrates an example process control environment that may be used to implement the example methods disclosed herein.

FIG. 1 illustrates an example process control system 100 that may be used to implement the example apparatus and methods disclosed herein. The example process control system 100 includes a process control environment 102 including any number of process control devices such as, for example, input devices 104 and 106 and/or output devices 108, 110 and 112. In some examples, the input devices 104 and 106 include valves, pumps, fans, heaters, coolers, mixers, and/or other devices, and the output devices 108, 110 and 112 include thermometers, pressure gauges, concentration gauges, fluid level meters, flow meters, vapor sensors, valve positioners, and/or any other suitable devices that acquire, generate, store, analyze, process, and/or transmit information. In the illustrated example, the output devices 108, 110 and 112 include sensors 114, 116 and 118 to acquire information (e.g., measured process information, environmental information, and/or input device information, etc.) related to an industrial process.

The example input devices 104 and 106 and the example output devices 108, 110 and 112 are communicatively coupled to a controller 120 (e.g., a DeltaV™ controller, a flow computer, a host, and/or any other controller) via a data bus (e.g., Standard Asynchronous/Synchronous Protocol (BSAP), Highway Addressable Remote Transducer Protocol (HART®), 3095 Modbus®, MVS205 Modbus®, etc.) or local area network (LAN). In some examples, the input devices 104 and 106 and/or the output devices 108, 110 and 112 are wirelessly communicatively coupled to the controller 120.

In the illustrated example, a control device 122 (e.g., a computer, a host, a handheld wireless device, a supervisory control system, and/or any other suitable control device) is communicatively coupled to the output devices 108, 110 and 112 via the controller 120. In the illustrated example, the controller 120 is communicatively coupled to the control device 122 via a network 124 (e.g., the internet). In some examples, the control device 122 is communicatively coupled directly to the example output devices 108, 110 and 112. In some examples, the controller 120 and/or the control device 122 generates notifications, alert messages, and/or other information.

The example controller 120 and/or the example control device 122 transmit instructions to the input devices 104 and 106 to control the process. In the illustrated example, the controller 120 and/or the control device 122 transmit instructions, commands, and/or information to the output devices 108, 110 and 112 and/or receive information transmitted by the output devices 108, 110 and 112. In some examples, the information transmitted by the controller 120 and/or the control device 122 to the output devices 108, 110 and 112 includes information such as, for example, input device information (e.g., pump characteristics, valve characteristics, etc.), output device information (e.g., sensor characteristics, the location of the output device, type of output device, name of the output device (e.g., a serial number), damping information, filtering information, etc.), ambient environment information (e.g., temperatures, etc.), process fluid information, flow passageway parameters and/or characteristics, the process control environment location, a process facility name and/or location, notifications, alarm information, and/or any other information.

In some examples, the controller 120 and/or the control device 122 analyze the information received from the output devices 108, 110 and 112. In the illustrated example, one or more of the output devices 108, 110 and 112 acquires information such as, for example, a differential pressure, a static pressure, a temperature of a process fluid, and/or any other information. Based on the information, the example controller 120 and/or the example control device 122 determines (e.g., calculates) values such as fluid density, fluid velocity, fluid viscosity, beta ratio, gas expansion, discharge coefficient, velocity of approach, Reynolds Number, mass flow rate, volumetric flow rate, energy flow rate, totalized flow rate, etc. In other examples, the output devices 108, 110 and 112 acquire other information and/or the controller 120 and/or the control device 122 determines other values.

Although one controller 120 and one control device 122 are shown in the example of FIG. 1, one or more additional controllers and/or control devices may be included in the example process control system 100 without departing from the teachings of this disclosure. In the illustrated example, the controller 120 is located in the process control environment 102 (e.g., in a workstation, a control room, and/or any other suitable location in the process control environment 102), and the control device 122 is located outside of the process control environment 102 (e.g., in another process control facility, on a remote worker's person, at an offsite facility, etc.). However, the controller 120 and/or the control device 122 may be located within or outside the example process control environment 102.

In the illustrated example, one of the example output devices 108 is communicatively coupled to a portable field device 126 (e.g., a Fisher® 475 Field Communicator, a laptop computer, a smartphone, etc.). In the illustrated example, the output device 108 is communicatively coupled to the portable field device 126 via any suitable protocol (e.g., BSAP, HART®, 3095 Modbus®, MVS205 Modbus®, etc.). In some examples, the portable field device 126 is used to calibrate the example output device 108 and/or transmit information (e.g., input device information (e.g., pump characteristics, valve characteristics, etc.), output device information (e.g., sensor characteristics, the location of the output device, type of output device, name of the output device (e.g., a serial number), damping information, filtering information, etc.), ambient environment information (e.g., temperatures, etc.), process fluid information, flow passageway parameters and/or characteristics, the process control environment location, the process facility name and/or location, notifications, alarm information, and/or any other information) to the example output device 108. In some examples, the portable field device 126 receives and stores (e.g., via nonvolatile memory) the information transmitted by the example output device 108.

The example output devices 108, 110 and 112 acquire the information related to the industrial process and transmit the information to the example controller 120, the example control device 122, and/or the example portable field device 126. In some examples, the output devices 108, 110 and 112 acquire information regarding the same process condition and/or parameter. In other examples, the output devices 108, 110 and 112 acquire information regarding different process conditions and/or parameters. The example output devices 108, 110 and 112 may be disposed in different locations within the example process control environment 102.

In the illustrated example, some of the example output devices 108 and 110 include a display 128 and 130 and some of the output devices 112 do not include a display. As described in greater detail below, information acquired by the output devices 108, 110 and 112, information from the portable field device 126, information from the controller 120, information from the control device 122, values determined by the controller 120 and/or the control device 122, and/or any other suitable information may be displayed on one or more of the example displays 128 and 130 of the output devices 108 and 110.

Figure 2:
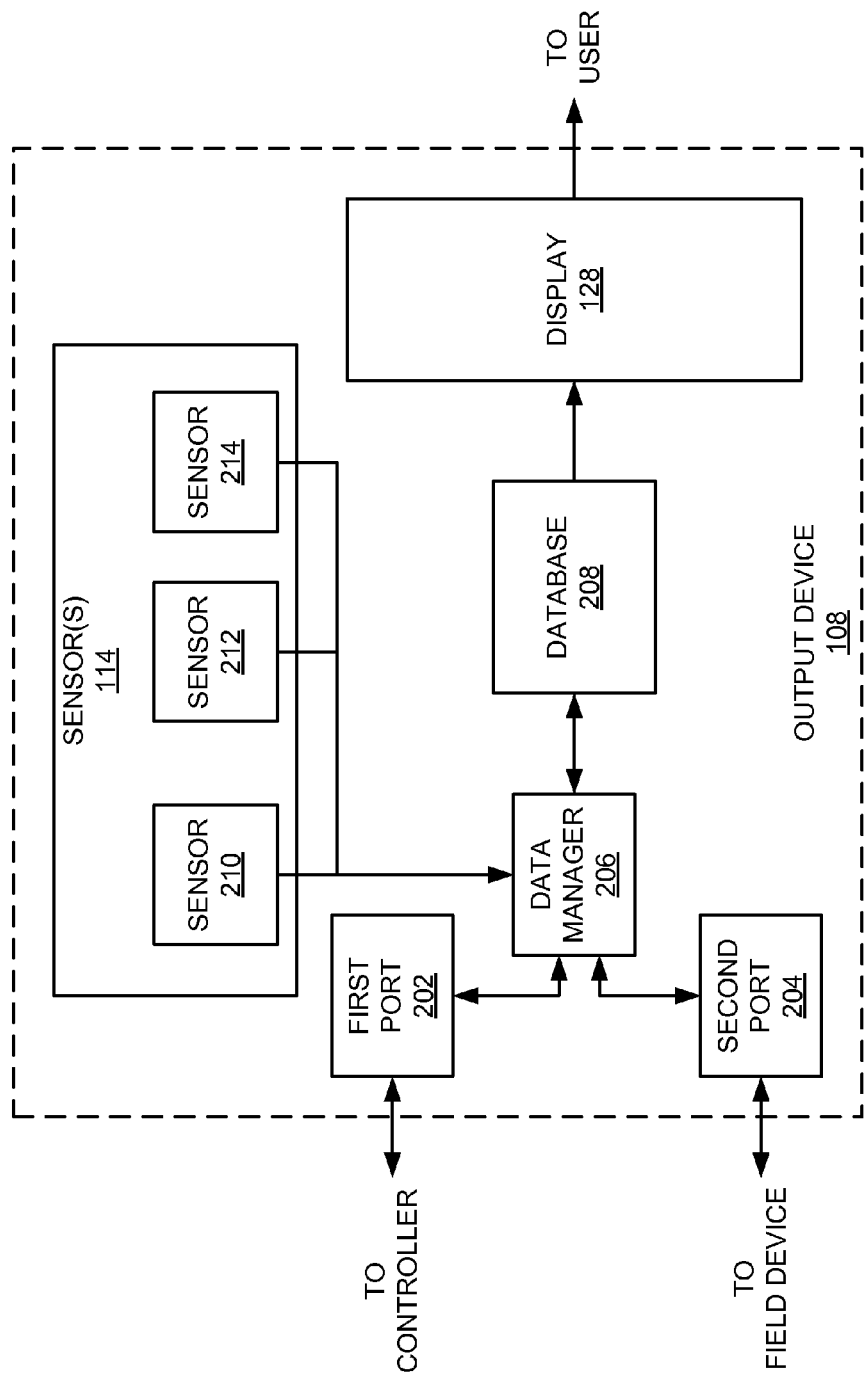
FIG. 2 illustrates a block diagram of an example output device disclosed herein.

FIG. 2 is a block diagram of the example output device 108 of FIG. 1. In the illustrated example, the output device 108 includes a first port 202, a second port 204, a data manager 206, a database 208, the sensors 114, which includes a first sensor 210, a second sensor 212 and a third sensor 214, and the display 128.

The example output device 108 is communicatively coupled to the controller 120 and/or the control device 122 via the first port 202, and the example output device 108 is communicatively coupled to the portable field device 126 via the second port 204. In some examples, an operator manually communicatively couples the portable field device 126 to the output device 108 (e.g., via a connector). In other examples, the portable field device 126 is wirelessly communicatively coupled to the output device 108.

The example sensors 114, 210, 212 and 214 acquire information related to the industrial process. In some examples, the sensors 114, 210, 212 and 214 are pressure gauges, temperature sensors, resistance temperature detectors, and/or any other suitable sensors. In some such examples, the sensors 114, 210, 212 and 214 acquire information such as, for example, fluid differential pressure, static fluid pressure, and/or fluid temperature.

The example data manager 206 of FIG. 2 analyzes, processes, organizes and/or stores information. In the illustrated example, the data manager 206 analyzes, processes, organizes, and/or stores the information acquired via the sensors 114, 210, 212 and 214 and/or received from the controller 120, the control device 122, and/or the portable field device 126. In some examples, based on the information acquired via one or more of the example sensors 114, 210, 212 and 214, the data manager 206 determines if the sensors 114, 210, 212 and 214 are working properly. If the example sensors 114, 210, 212 and 214 are not working properly, the data manager 206 generates a notification, an alert, and/or an alarm. The example data manager 206 generates other notifications, alerts, and/or alarms in response to other events.

In some examples, the data manager 206 converts units of a value received from the controller 120 and/or acquired via the sensors 114, 210, 212 and 214. In some examples, the data manager 206 organizes the information by generating one or more tables in the database 208, replacing information stored in the database 208 with other information, tagging the information (e.g., with an identifier, time, location, etc.), and/or performing any other desired action.

The example data manager 206 responds to requests, instructions, and/or commands from the portable field device 126, the controller 120, and/or the control device 122. In some examples, the portable field device 126, the controller 120, and/or the control device 122 sends commands to the data manager 206 to transmit information acquired via one or more of the sensors 114, 210, 212 and 214. In response to the commands, the data manager 206 transmits the information to the portable field device 126, the controller 120, and/or the control device 122. In some examples, the data manager 206 transmits information to the controller 120 and/or the control device 122 without receiving a command from the local controller 120 and/or the control device 122 (i.e., automatically).

The example database 208 may be used to store the information acquired via the sensors 114, 210, 212 and 214; received from the portable field device 126, the controller 120, and/or the control device 122; analyzed by the data manager 206; generated by the data manager 206; and/or any other information. In some examples, the database 208 segregates a portion of the information (e.g., dynamic information such as, for example, information acquired via the sensors 114, 210, 212 and 214, ambient environment conditions, values calculated based on the information acquired via the sensors 114, 210, 212 and 214, etc.) from another portion of the information (e.g., static information such as, for example, fluid characteristics, output device location, output device filtering information, output device damping information, sensor material information, etc.).

Any of the information acquired via the sensors 114, 210, 212 and 214; received from the controller 120, the control device 122, and/or the portable field device 126; processed and/or generated by the data manager 206; and/or stored in the database 208 may be displayed via the display 128. In some examples, the display 128 is a liquid crystal display (LCD). The data manager 206, the controller 120, the control device 122, and/or the portable field device 126 determine which information is displayed via the display 128. In the illustrated example, the controller 120, the control device 122, and/or the portable field device 126 send a command to the data manager 206 to display information acquired via the sensors 114, 210, 212 and 214 such as, for example, a pressure differential of a fluid, a static pressure of the fluid, and/or a temperature of the fluid. As a result, the pressure differential, the static pressure, and the temperature are displayed via the display 128, thereby enabling an operator located at or near the example output device 108 to visually monitor the process. In other examples, the controller 120, the control device 122, and/or the portable field device 126 send other commands to display other information. In some examples, the data manager 206 causes the information acquired via the sensors 114, 210, 212 and 214 to be displayed without receiving a command from the controller 120, the control device 122, and/or the portable field device 126.

In some examples, information received from the controller 120, the control device 122, and/or the portable field device 126 is displayed via the display 128. In the illustrated example, values calculated by the controller 120 and/or the control device 122 based on the information acquired via the sensors 114, 210, 212 and 214 are displayed. In some examples, the calculated values are displayed alongside the information acquired via the sensors 114, 210, 212 and 214. Thus, an operator located at or near the output device 108, an operator located at the controller 120 (e.g., in a control room), and/or an operator located at the control device 122 (e.g., in another process control facility) may monitor the information acquired via the sensors 114, 210, 212 and 214 and the values calculated by the controller 120 and/or the control device 122 based on the information acquired via the sensors 114, 210, 212 and 214.

In some examples, information from the other output devices 110 and 112 is displayed via the display 128 of the example output device 108 of FIG. 2. In the illustrated example, information acquired by the output devices 108, 110 and 112 is transmitted to the controller 120 and/or the control device 122. In some examples, the controller 120 and/or the control device 122 analyzes the information from the output devices 108, 110 and 112 by, for example, calculating flow rates of a process fluid. In some such examples, the controller 120 and/or the control device 122 transmits the flow rates to the example output device 108 of FIG. 2, and the output device 108 displays the flow rates via the display 128. Thus, the example output device 108 displays information acquired and/or derived from a plurality of the output devices 108, 110 and 112. As a result, an operator located at or near the example output device 108 of FIG. 2 can monitor and/or compare process conditions at multiple locations in a process control environment (e.g., the example process control environment 102 of FIG. 1) via the display 128 of the example output device 108. In some such examples, the output device 108 displays information acquired from an output device that does not include a display such as, for example, the example output device 112 of FIG. 1.

While an example output device 108 has been illustrated in FIG. 2, one or more of the elements, processes and/or devices illustrated in FIG. 2 may be combined, divided, re-arranged, omitted, eliminated and/or implemented in any other way. Further the example first port 202, the second port 204, the data manager 206, the sensors 114, which includes the first sensor 210, the second sensor 212 and the third sensor 214, the database 208, the field device 128, and/or, more generally, the example output device 108 of FIG. 2 may be implemented by hardware, software, firmware and/or any combination of hardware, software and/or firmware. Thus, for example, any of the example first port 202, the second port 204, the data manager 206, the sensors 114, which includes the first sensor 210, the second sensor 212 and the third sensor 214, the database 208, the field device 128, and/or, more generally, the example output device 108 of FIG. 2 could be implemented by one or more circuit(s), programmable processor(s), ASIC(s), PLD(s) and/or FPLD(s), etc. When any of the apparatus or system claims of this patent are read to cover a purely software and/or firmware implementation, at least one of the example first port 202, the second port 204, the data manager 206, the sensors 114, which includes the first sensor 210, the second sensor 212 and the third sensor 214, the database 208, the field device 128, and/or the example output device 108 are hereby expressly defined to include a tangible computer readable medium such as a memory, DVD, CD, Blu-ray, etc. storing the software and/or firmware. Further still, the example output device 108 of FIG. 2 may include one or more elements, processes and/or devices in addition to, or instead of, those illustrated in FIG. 2, and/or may include more than one of any or all of the illustrated elements, processes and devices.

Figure 3:
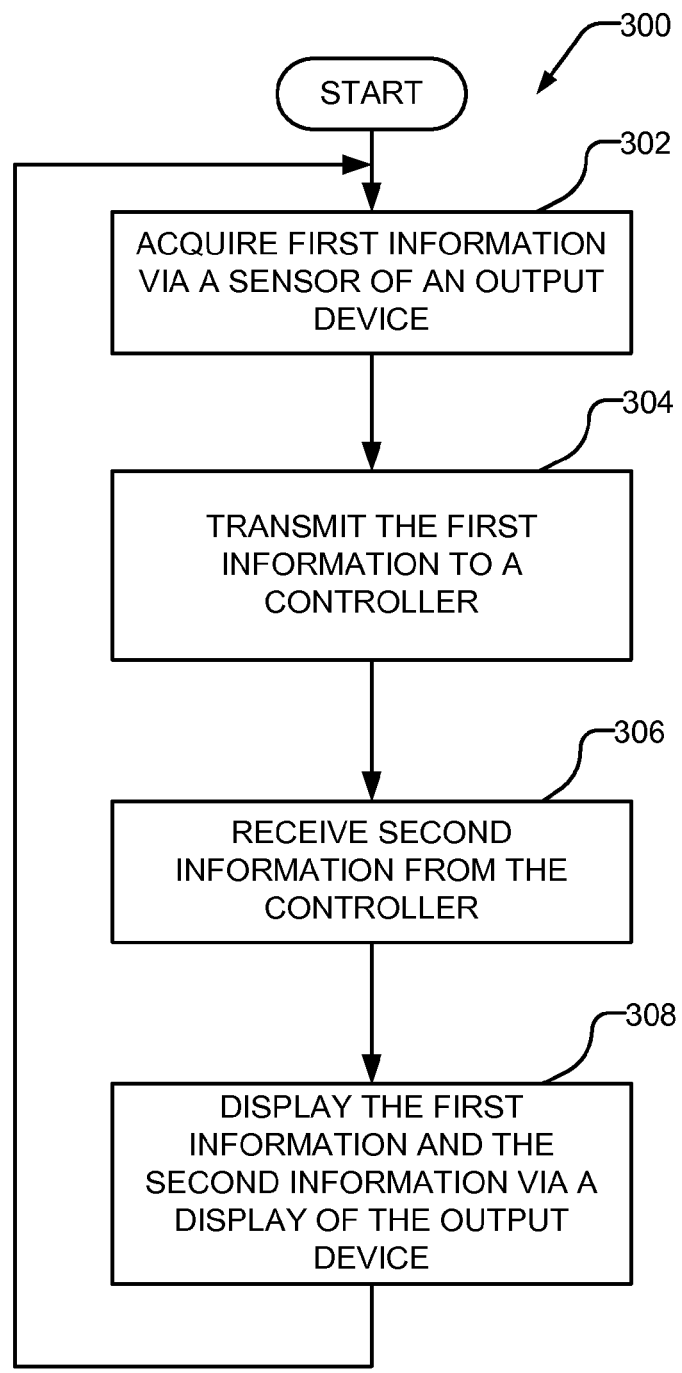
FIG. 3 is a flow chart representative of an example method disclosed herein.
Figure 4:
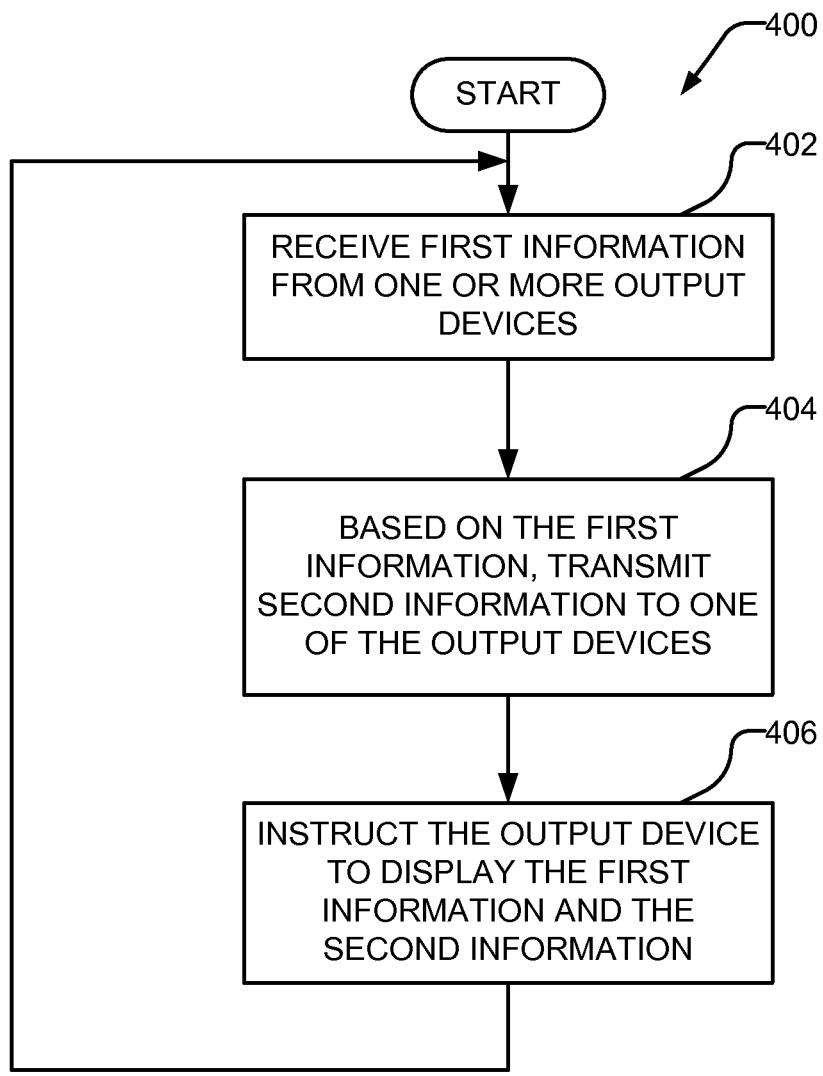
FIG. 4 is a flow chart representative of another example method disclosed herein.

Flowcharts representative of example processes or methods that may be implemented by the example first port 202, the second port 204, the data manager 206, the sensors 114, which includes the first sensor 210, the second sensor 212 and the third sensor 214, the database 208, the field device 128, and/or, more generally, the example output device 108 of FIG. 2 are shown in FIGS. 3 and 4. In these examples, the example methods may comprise a program for execution by a processor such as the processor 512 shown in the example processor platform 500 discussed below in connection with FIG. 5. The program may be embodied in software stored on a tangible computer readable storage medium such as a compact disc read-only memory ("CD-ROM"), a floppy disk, a hard drive, a DVD, Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3 and 4, many other methods of implementing the example output device 108 may alternatively be used. For example, the order of execution of the blocks may be changed, and/or some of the blocks described may be changed, eliminated, or combined.

As mentioned above, the example methods or operations of FIGS. 3 and/or 4 may be implemented using coded instructions (e.g., computer readable instructions) stored on a tangible computer readable storage medium such as a hard disk drive, a flash memory, a read-only memory ("ROM"), a CD, a DVD, a cache, a random-access memory ("RAM") and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3 and/or 4 be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The example method 300 of FIG. 3 begins at block 302 by the sensor of the output device 108 acquiring first information related to an industrial process. In the illustrated example, the sensors 114, 210, 212 and 214 determine a pressure differential, a static pressure, and/or a temperature of a fluid flowing through a fluid flow passageway. At block 304, the data manager 206 of the output device 108 transmits the first information to the controller 120. The output device 108 and the controller 120 may be communicatively coupled via any suitable protocol such as, for example, BSAP, 3095 Modbus®, MVS205 Modbus®, etc.

At block 306, the data manager 206 receives second information from the controller 120. In some examples, the second information is a value of a process parameter that is calculated based on the first information. In the illustrated example, based on the first information, the controller 120 determines (e.g., calculates) values such as fluid density, fluid velocity, fluid viscosity, beta ratio, gas expansion, discharge coefficient, velocity of approach, Reynolds Number, mass flow rate, volumetric flow rate, energy flow rate, totalized flow rate, etc. In some examples, the second information is information transmitted to the controller 120 by the other output devices 110 and 112 and/or values calculated based on information acquired via the other output devices 110 and 112.

In some examples, the second information includes information such as, for example, input device information (e.g., pump characteristics, valve characteristics, etc.), output device information (e.g., sensor characteristics, a location of the output device, type of output device, a name of the output device (e.g., a serial number), damping information, output device filtering information, etc.), ambient environment information (e.g., temperatures, etc.), process fluid information, flow passageway parameters and/or characteristics, a process control environment location, a process facility name and/or location, notifications, alarm information and/or any other information.

At block 308, the display 128 of the output device 108 displays the first information and the second information. In some examples, the first information is displayed alongside the second information. In some examples, tags are displayed adjacent the first information and/or the second information to label and/or identify the first information and/or the second information. In some examples, the tags include third information such as, for example, a process parameter name, units of the process parameter, name of the output device, location of the output device, and/or any other suitable information and/or identifier. In some examples, the tags are stored in the database 208 and/or received from the controller 120.

Although the example instructions of FIG. 3 are discussed in conjunction with the example controller 120, other example instructions are implemented in conjunction with the controller 120, the control device 122, and/or the portable field device 126.

FIG. 4 illustrates another example method 400 disclosed herein. The example method 400 of FIG. 4 begins at block 402 by the controller 120 receiving first information from one or more output devices 108, 110 and 112. In some examples, the first information is acquired via the sensors 114, 116 and 118 of the output devices 108, 110 and 112 and includes information relating to an industrial process such as, for example, static pressures, differential pressures, and/or temperatures of a fluid.

At block 404, second information is transmitted to one of the output devices 108. In some examples, the second information includes information such as, for example, input device information (e.g., pump characteristics, valve characteristics, etc.), output device information (e.g., sensor characteristics, a location of the output device, type of output device, a name of the output device (e.g., a serial number), damping information, output device filtering information, etc.), ambient environment information (e.g., temperatures, etc.), process fluid information, flow passageway parameters and/or characteristics, a process control environment location, a process facility name and/or location, notifications, alarm information and/or any other information.

In some examples, the second information includes information transmitted to the controller 120 by the other output devices 110 and 112. In some examples, the second information includes values of process parameters (e.g., fluid flow rates) calculated based on the information received from the one or more of the output devices 108, 110 and 112. In some examples, based on the first information, the controller 120 determines (e.g., calculates) values such as fluid density, fluid velocity, fluid viscosity, beta ratio, gas expansion, discharge coefficient, velocity of approach, Reynolds Number, mass flow rate, volumetric flow rate, energy flow rate, totalized flow rate, etc. In other examples, the controller 120 determines other values.

At block 406, the controller 120 instructs the data manager 206 of the output device 108 to display the first information and the second information. In some examples, the controller 120 instructs the data manager 206 to display the first information alongside the second information.

Although the example instructions of FIG. 4 are discussed in conjunction with the example controller 120, other example instructions are implemented in conjunction with the controller 120, the control device 122, and/or the portable field device 126.

Figure 5:
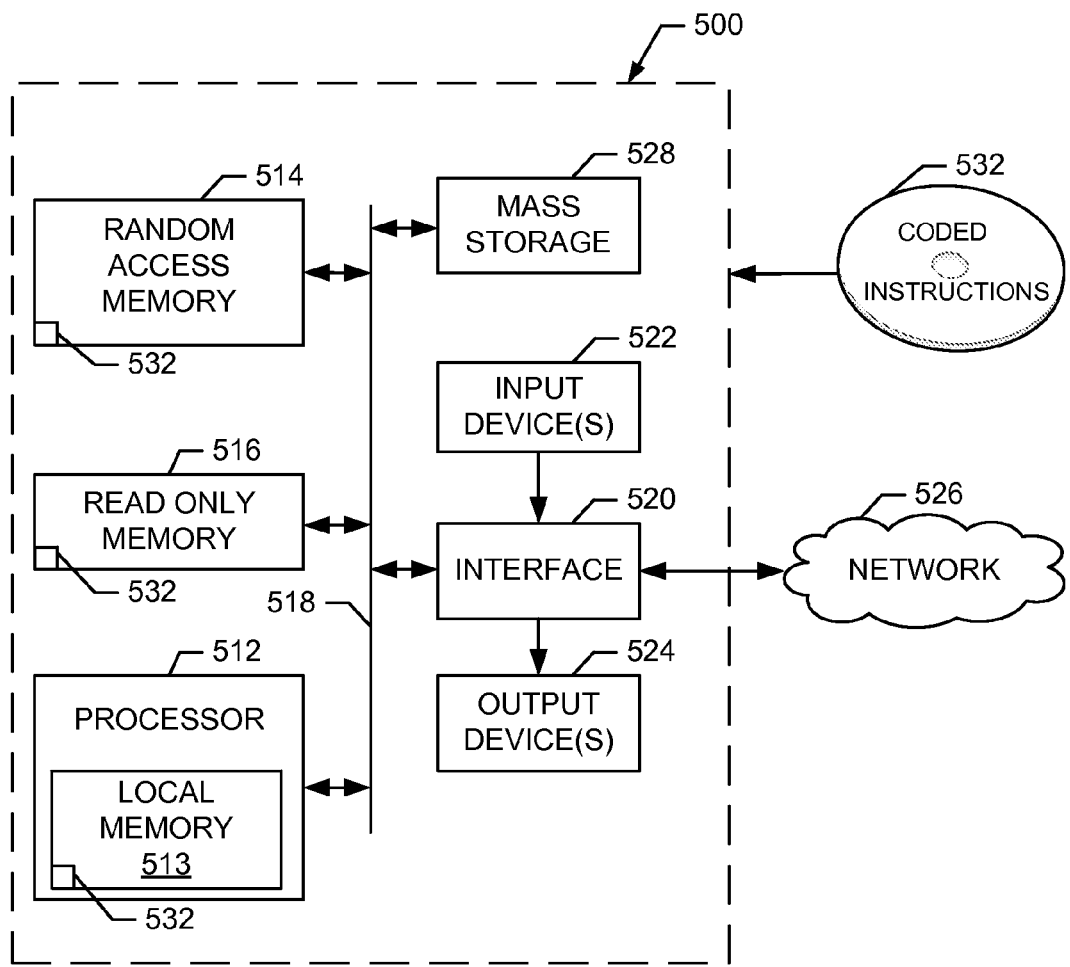
FIG. 5 is a block diagram of an example processor platform that may be used to implement the example methods and apparatus disclosed herein.

FIG. 5 is a block diagram of an example processor platform 500 capable of executing the methods of FIGS. 3 and/or 4 to implement the example controller 120, the control device 122, the portable field device 126, and/or the first port 202, the second port 204, the data manager 206 206, the sensor 208, the sensor 210, the sensor 212, the database 208, the field device 128, and/or, more generally, the example output device 108 of FIG. 2. The processor platform 500 can be a computer, a server or any other type of computing device.

The processor platform 500 of the instant example includes a processor 512. For example, the processor 512 can be implemented by one or more microprocessors or controllers from any desired family or manufacturer. The processor 512 includes a local memory 513 (e.g., a cache) and is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 also includes an interface circuit 520. The interface circuit 520 may be implemented by any type of interface standard, such as an Ethernet interface, a universal serial bus (USB), a protocol port interface, and/or a PCI express interface.

One or more input devices 522 are connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system.

One or more output devices 524 are also connected to the interface circuit 520. The output devices 524 can be implemented, for example, by display devices (e.g., a liquid crystal display, a cathode ray tube display (CRT), etc.). The interface circuit 520, thus, typically includes a graphics driver card.

The interface circuit 520 also includes a communication device such as a modem or network interface card to facilitate exchange of data with external computers via the network 124 (e.g., an Ethernet connection, a digital subscriber line (DSL), a telephone line, coaxial cable, a cellular telephone system, etc.).

The processor platform 500 also includes one or more mass storage devices 528 for storing software and data. Examples of such mass storage devices 528 include floppy disk drives, hard drive disks, compact disk drives and digital versatile disk (DVD) drives. The mass storage device 528 may implement a local storage device.

Coded instructions 532 to implement the methods of FIGS. 3 and/or 4 may be stored in the mass storage device 528, in the local memory 513, in the volatile memory 514, in the non-volatile memory 516, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a metering device installed at a location in an industrial process environment, the metering device housing:
   a first sensor to acquire first process control characteristic data of an industrial process at the location in the industrial process environment;
   a processor in communication with the first sensor of the metering device and a controller separate from the metering device, the processor to communicate the first process control characteristic data to the controller and receive second process control characteristic data from the controller, the second process control characteristic data calculated based on the first process control characteristic data; and
   a display in communication with the processor to display the first process control characteristic data acquired from the first sensor and the second process control characteristic data received from the controller to enable monitoring of the industrial process at the location of the metering device in the industrial process environment.

2. The apparatus of claim 1, wherein the metering device further includes a first port, the processor in communication with the controller via the first port.

3. The apparatus of claim 2, wherein the metering device further includes a second port, the processor to be in communication with a portable field device via the second port, wherein the display is to display third process control characteristic data received by the processor from the portable field device.

4. The apparatus of claim 1, wherein the display is to display the first process control characteristic data adjacent the second process control characteristic data.

5. A method for monitoring an industrial process from an industrial process environment, the method comprising:
   acquiring first process control characteristic data of the industrial process via a first sensor housed in a first metering device installed at a first location in the industrial process environment;

communicating, via a processor housed in the first metering device, the first process control characteristic data from the first metering device to a controller separate from the first metering device;

receiving, via the processor, second process control characteristic data in the first metering device from the controller, the second process control characteristic data calculated based on the first process control characteristic data; and displaying the first and second process control characteristic data via a display housed in the first metering device to enable monitoring of the industrial process at the first location in the industrial process environment.

6. The method of claim 5, further including receiving third process control characteristic data from the controller, the third process control characteristic data related to a second metering device installed at a second location of the industrial process environment.

7. The method of claim 6, wherein the third process control characteristic data is calculated by the controller based on fourth process control characteristic data acquired via a second sensor of the second metering device at the second location.

8. The method of claim 6, further including displaying the third process control characteristic data via the display adjacent at least one of the first process control characteristic data or the second process control characteristic data.

9. The method of claim 5, wherein the first process control characteristic data includes at least one of measured process information, environmental information or input device information.

10. The method of claim 5, further including receiving third process control characteristic data in the first metering device from the controller, the third process control characteristic data including a tag to identify one of the first process control characteristic data or the second process control characteristic data.

11. The method of claim 10, further including displaying, via the display at the first location, the tag adjacent the one of the first process control characteristic data or the second process control characteristic data.

12. The method of claim 5, further including receiving a command from the controller to display the first process control characteristic data at the first location.

13. The method of claim 5, further including:
acquiring third process control characteristic data via a second sensor housed in the first metering device; and
communicating the third process control characteristic data from the first metering device to the controller, wherein the second process control characteristic data received from the controller is calculated based on the first process control characteristic data and the third process control characteristic data.

14. The method of claim 5, further including receiving, via the processor of the first metering device, third process control characteristic data in the first metering device from the controller, the third process control characteristic data including at least one of an alert, an alarm or a notification generated by a second metering device.

15. A method for monitoring process controls of an industrial control environment, the method comprising:
receiving, via a controller, first process control characteristic data of an industrial process from a first metering device that is separate from and in communication with the controller and installed at a location in the industrial control environment, the first process control characteristic data acquired via a first sensor housed in the first metering device;

determining, via the controller, second process control characteristic data based on the first process control characteristic data; and communicating, via the controller, the second process control characteristic data to a processor of the first metering device, the first and second process control characteristic data to be displayed via a display housed in the first metering device to enable monitoring of the industrial process at the location of the industrial control environment at which the first metering device is installed.

16. The method of claim 15, further including communicating an instruction to the first metering device to display the first process control characteristic data adjacent the second process control characteristic data.

17. The method of claim 15, further including:
communicating a tag to the first metering device; and
communicating an instruction to the first metering device to display the tag adjacent the first process control characteristic data or the second process control characteristic data to identify the first process control characteristic data or the second process control characteristic data.

18. The method of claim 15, wherein the second process control characteristic data includes at least one of a fluid density, a fluid velocity, a fluid viscosity, a beta ratio, a discharge coefficient, a velocity of approach, a Reynolds Number, a mass flow rate, a volumetric flow rate, an energy flow rate, or a totalized flow rate.

19. The method of claim 15, further including:
receiving third process control characteristic data of the industrial process from a second metering device;
determining the second process control characteristic data or fourth process control characteristic data based on the third process control characteristic data;
communicating the second process control characteristic data or the fourth process control characteristic data to the first metering device; and
communicating an instruction to the first metering device to display the second process control characteristic data or the fourth process control characteristic data at the location of the industrial control environment at which the first metering device is installed.

20. The method of claim 5, further including receiving third process control characteristic data from a control device via the controller, the control device located outside of the industrial process environment.

* * * * *